(12) United States Patent
Miller

(10) Patent No.: US 11,162,678 B2
(45) Date of Patent: Nov. 2, 2021

(54) HOPPER SYSTEM

(71) Applicant: Dirigo Timberlands Co., North Anson, ME (US)

(72) Inventor: Blaine Miller, Embden, ME (US)

(73) Assignee: Dirigo Timberlands Co., North Anson, ME (US)

( * ) Notice: Subject to any disclaimer, the term of this patent is extended or adjusted under 35 U.S.C. 154(b) by 158 days.

(21) Appl. No.: 15/891,805

(22) Filed: Feb. 8, 2018

(65) Prior Publication Data

US 2018/0231247 A1    Aug. 16, 2018

Related U.S. Application Data

(60) Provisional application No. 62/457,464, filed on Feb. 10, 2017.

(51) Int. Cl.
| | |
|---|---|
| *F23G 5/04* | (2006.01) |
| *F23K 1/04* | (2006.01) |
| *F23G 5/44* | (2006.01) |
| *F23L 15/04* | (2006.01) |
| *F23G 5/02* | (2006.01) |
| *F23G 7/10* | (2006.01) |
| *F23G 5/46* | (2006.01) |

(52) U.S. Cl.
CPC .............. *F23G 5/04* (2013.01); *F23G 5/02* (2013.01); *F23G 5/444* (2013.01); *F23G 5/46* (2013.01); *F23G 7/105* (2013.01); *F23K 1/04* (2013.01); *F23L 15/04* (2013.01); *F23G 2201/10* (2013.01); *F23G 2205/12* (2013.01); *F23G 2205/121* (2013.01); *F23G 2205/122* (2013.01); *F23G 2205/14* (2013.01); *F23G 2206/10* (2013.01); *F23G 2207/20* (2013.01); *F23K 2201/20* (2013.01); *Y02E 20/34* (2013.01)

(58) Field of Classification Search
CPC ...................................................... F23G 5/04
See application file for complete search history.

(56) References Cited

U.S. PATENT DOCUMENTS

| | | | | |
|---|---|---|---|---|
| 2,984,015 | A * | 5/1961 | Montgomery | F26B 17/102 34/60 |
| 4,030,895 | A * | 6/1977 | Caughey | C10J 3/20 48/111 |
| 4,167,909 | A * | 9/1979 | Dauvergne | F23B 5/04 110/207 |
| 4,391,205 | A | 7/1983 | Morey | |
| 4,414,813 | A * | 11/1983 | Knapp | F01K 23/06 60/39.182 |
| 4,539,916 | A * | 9/1985 | Paoluccio | F23G 5/04 110/203 |
| 4,574,712 | A | 3/1986 | David | |

(Continued)

OTHER PUBLICATIONS

International Search Report issued in PCT Application Serial No. PCT/US2018/017445 dated Apr. 13, 2018.

*Primary Examiner* — Nathaniel Herzfeld
(74) *Attorney, Agent, or Firm* — Brian J. Colandreo; Alexa Marie J. Derkasch; Holland & Knight LLP

(57) ABSTRACT

A fuel material processing system includes a hopper assembly configured to receive a fuel material. A drying system is configured to remove moisture from the fuel material to generate a dried fuel material. A material delivery system is configured to provide the dried fuel material to a combustion system.

19 Claims, 2 Drawing Sheets

(56) References Cited

U.S. PATENT DOCUMENTS

| | | | |
|---|---|---|---|
| 5,293,700 A | 3/1994 | Ishii | |
| 6,055,915 A * | 5/2000 | Bickell | F23G 5/50 110/101 CA |
| 6,237,511 B1 * | 5/2001 | Honkasalo | F23G 5/04 110/188 |
| 2011/0265734 A1 * | 11/2011 | Kim | F23G 5/0276 122/22 |
| 2015/0081086 A1 * | 3/2015 | Hallowell | G05D 7/0617 700/209 |
| 2017/0199069 A1 * | 7/2017 | McBride | G01F 23/266 |

* cited by examiner

HOPPER SYSTEM

RELATED APPLICATION(S)

This application claims the benefit of U.S. Provisional Application No. 62/457,464, filed on 10 Feb. 2017, the entire contents of which are incorporated herein by reference.

TECHNICAL FIELD

This disclosure relates to hopper systems and, more particularly, to hopper systems for holding wood chips.

BACKGROUND

Woody biomass chips have been used as fuel for heat and electrical generation for years, wherein these wood chips are hauled to a mill location and arrive with a moisture content varying from the high thirties to over fifty percent moisture content. While such high-moisture wood chips work for large boiler systems that are often co-fired with other combustible products (e.g., fuel oil), such high-moisture chips do not work for smaller boiler systems.

For example, chips that are produced in the woods during harvest operations often vary greatly in shape and size. And while this may work in the larger/industrial boiler environment where the feed systems are substantial and can accommodate oversized wood chunks, the smaller/residential boiler systems may need chips that are within the size requirements for that particular feed system. Specifically, oversize wood chips may clog such smaller/residential boiler systems.

Another important aspect that may limit the firing of such high-moisture wood chips in small/residential boilers is that these high-moisture wood chips may have a moisture content that exceeds what these smaller/residential boilers can efficiently burn (or even burn at all), wherein high-moisture hardwood chips may have a moisture content of 38-45% moisture and high-moisture softwood chips may have a moisture content of 45-55%.

SUMMARY OF DISCLOSURE

In one implementation, a fuel material processing system includes a hopper assembly configured to receive a fuel material. A drying system is configured to remove moisture from the fuel material to generate a dried fuel material. A material delivery system is configured to provide the dried fuel material to a combustion system.

One or more of the following features may be included. The combustion system may include a boiler system. The hopper system may be configured to direct the dried fuel material toward the material delivery system. The material delivery system may include an auger system. The material delivery system may include a conveyer system. The drying system may include an air supply system configured to move drying air through the fuel material. The air supply system may include a fan assembly configured to provide the drying air. The drying system may further include a drying air heating system configured to heat the drying air. The drying air heating system may include a heat exchanger system configured to recover at least a portion of the waste heat generated by the combustion system. The hopper system may include a perforated portion that is configured to allow for the passage of the drying air. The perforated portion of the hopper system may be positioned proximate a lower portion of the hopper system. A material heating system may be configured to heat the fuel material included within the hopper assembly. The material heating system may include a combustion-based material heating system. A level monitoring system may be configured to determine the quantity of fuel material included within the hopper assembly. The fuel material may be a high-moisture fuel material. The high-moisture fuel material may include high-moisture wood chips. A filtering system may be configured to filter the fuel material prior to the fuel material being received by the hopper assembly. The filtering system may include a screening system.

In another implementation, a hopper assembly is configured to receive a fuel material, wherein the fuel material is a high-moisture fuel material. A drying system is configured to remove moisture from the fuel material to generate a dried fuel material, wherein the drying system includes an air supply system configured to move drying air through the fuel material. A material delivery system is configured to provide the dried fuel material to a combustion system. The hopper system includes a perforated portion that is configured to allow for the passage of the drying air.

In another implementation, a fuel material processing system includes a hopper assembly configured to receive high-moisture wood chips. A drying system is configured to remove moisture from the high-moisture wood chips to generate a dried fuel material, wherein the drying system includes an air supply system configured to move drying air through the high-moisture wood chips. A material delivery system is configured to provide the dried fuel material to a combustion system, wherein the material delivery system includes an auger system. The hopper system is configured to direct the dried fuel material toward the material delivery system. The hopper system includes a perforated portion that is configured to allow for the passage of the drying air The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
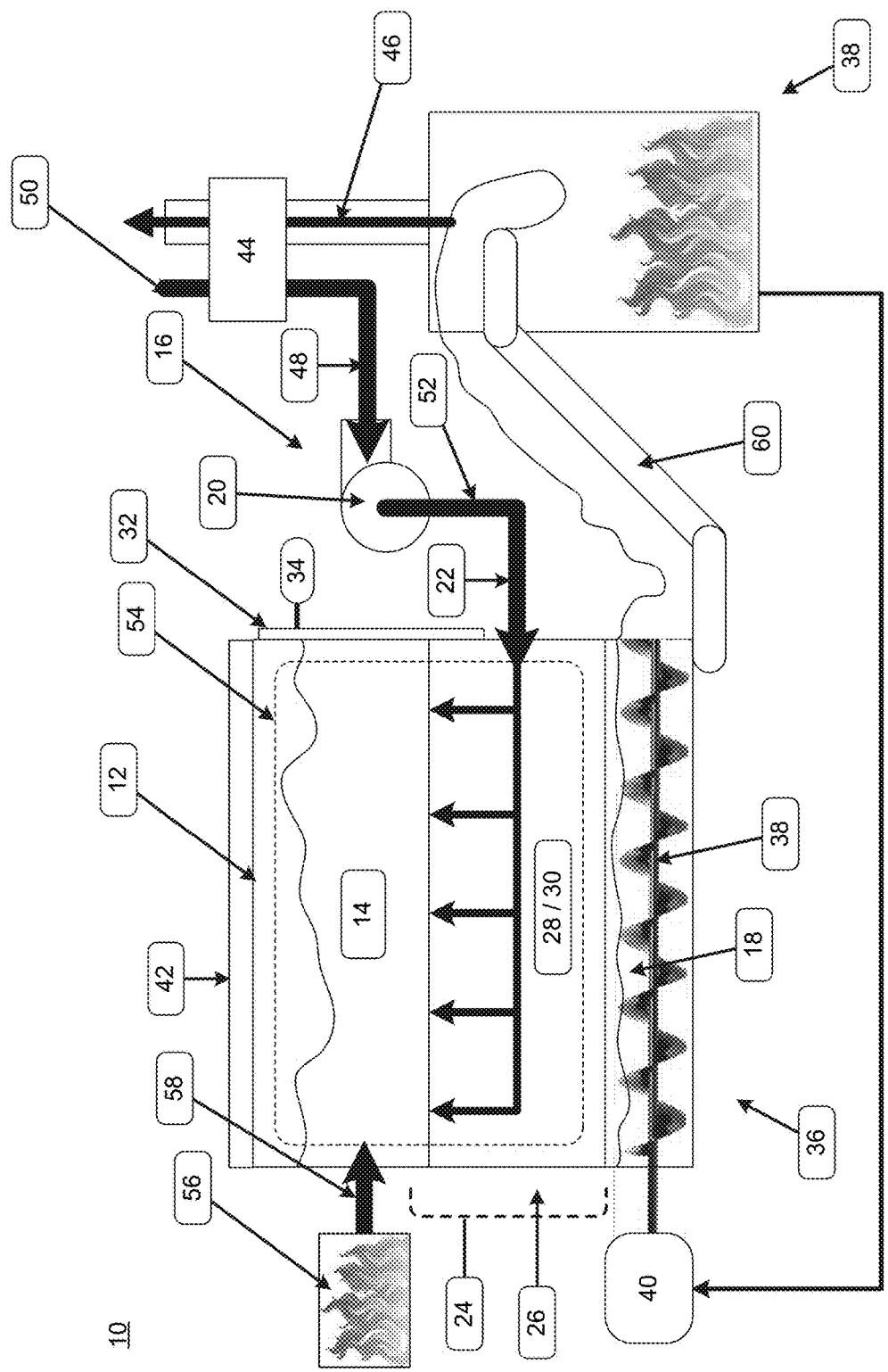
FIG. 1 is a diagrammatic view of a fuel material processing system coupled to a combustion system.
Figure 2:
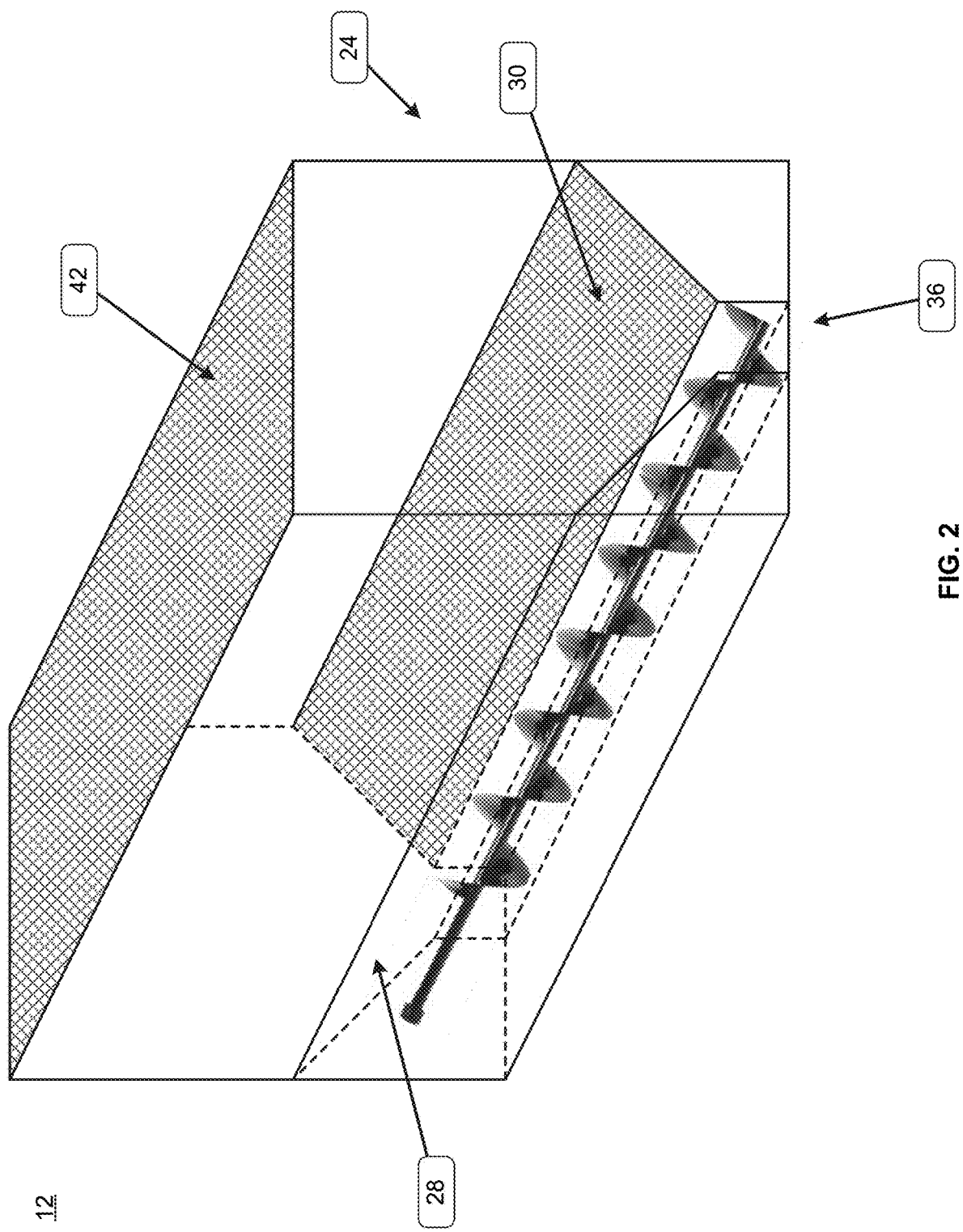
FIG. 2 is a perspective view of a hopper system of the fuel material processing system of FIG. 1.

Referring to FIGS. 1-2, there is shown various views of fuel material processing system 10 that, as will be discussed below in great detail, may be utilized to dry fuel material that may have a moisture content that it too high to be efficiently burned.

Fuel material processing system 10 may include hopper assembly 12 that may be configured to receive fuel material 14. Fuel material 14 may be any high-moisture fuel material, examples of which may include but are not limited to high-moisture wood chips, high-moisture biomass material, and/or any other high-moisture material that may be combustible and may be used as a fuel source.

Hopper assembly 12 may be bin-shaped and may be configured to temporarily store fuel material 14 during the drying process. Hopper assembly 12 may be constructed of any material suitable for the type and quantity of fuel material 14 being processed, examples of which may include sheet metal (when configured to store lower density/smaller quantities of fuel material 14, plate steel (when configured to store higher density/larger quantities of fuel material 14, or various composite materials (e.g., fiberglass, carbon fiber, etc.) that may provide a hopper system that is lighter in weight and/or resistant to corrosion.

Fuel material processing system 10 may include drying system 16 that may be configured to remove moisture from fuel material 14 to generate dried fuel material 18. As discussed above, fuel material 14 may be a high-moisture fuel material, examples of which may include but are not limited to high-moisture wood chips, high-moisture biomass fuel, and/or any other high-moisture material that may be used as a fuel source.

For example, fuel material 14 may be wood chips that are produced during a tree harvesting operation, wherein these wood chips may be provided to fuel processing system 10 in their "green" (i.e., moist) state. Specifically, fuel material 14 may have a moisture content that exceeds what smaller/residential boilers can efficiently burn (or even burn at all), wherein hardwood wood chips may have a moisture content in the range of 38-45% moisture, while softwood wood chips may have a moisture content in the range of 45-55% moisture. Drying system 16 that may be configured to reduce the content of fuel material 14 down to approximately 12% in a couple of days.

Drying system 16 may include air supply system 20 configured to move drying air 22 through fuel material 14 so that dried fuel material 18 may be generated. Examples of air supply system 20 may include but are not limited to a fan assembly that may be configured to provide drying air 22.

Hopper system 12 may include perforated portion 24 that may be configured to allow for the passage of drying air 22 through fuel material 14, wherein perforated portion 24 of hopper system 12 may be positioned proximate lower portion 26 of hopper system 12.

For example, a lower surface (e.g., lower surfaces 28, 30) of hopper system 12 may be a perforated portion that may be constructed of a mesh material/grate material, wherein (in this example) lower surfaces 28, 30 include perforations large enough to allow for the efficient passage of drying air 22; while small enough to prevent fuel material 14 from passing/falling through the perforated portions. Accordingly, if fuel material 14 is wood chips that are 2-3 inches in size, the perforated portions (e.g., lower surfaces 28, 30) of hopper system 12 may include a plurality of smaller perforations (e.g., in the range of $1/32^{nd}$ of an inch to $1/4^{th}$ of an inch) that may allow for the passage of drying air 22 while preventing the 2-3 inch wood chips from falling through these perforated portions of hopper system 14.

Fuel material processing system 10 may include level monitoring system 32 configured to determine the quantity of fuel material 14 included within hopper assembly 12. Examples of level monitoring system 32 may include any combination of manual systems, electronic systems and automated systems. For example, level monitoring system 32 may include a mechanical sight window that allows an operator (not shown) to physically look into hopper system 12 to see the quantity of fuel material 14 within hopper system 12. Additionally, another example of level monitoring system 32 may include an electronic monitoring system that monitors the quantity of fuel material 14 within hopper system 12 and provides a signal (e.g., signal 34) to an administrator (not shown), wherein signal 34 may be indicative of the quantity of fuel material 14 within hopper system 12. Further, another example of level monitoring system 32 may include an automated electronic system that may monitor the quantity of fuel material 14 within hopper system 12 and (at a predefined level) may provide an order signal (e.g., signal 34) to a supplier of fuel material (not shown) so that hopper system 12 may be replenished with fuel material 14.

Fuel material processing system 10 may include material delivery system 36 that may be configured to provide dried fuel material 18 to combustion system 38. Examples of combustion system 38 may include but are not limited to a boiler system that may be configured to burn fuel material 14.

Examples of the types of material delivery system 36 may include but is not limited to any type of electrical-based system, mechanical-based system, gravity-based system, hydraulic-based system, pneumatic-based system and/or any combinations thereof. Specific examples of material delivery system 36 may include but are not limited to electric-based or hydraulic-based auger system 38 (as shown in FIG. 1), wherein electric-based or hydraulic-based auger system 38 may be powered by motor 40 (e.g., an electric motor or a hydraulic motor). While material delivery system 36 is shown in FIG. 1 to be electric-based or hydraulic-based auger system 38, this is for illustrative purposes only and is not intended to be a limitation of this disclosure, as other configurations are possible and are considered to be within the scope of this disclosure, as other configurations are possible. For example, material delivery system 36 may include an electric-based or hydraulic-based conveyer system.

Hopper system 12 may be configured to direct dried fuel material 18 toward material delivery system 36. Accordingly, a lower surface (e.g., lower surfaces 28, 30) of hopper system 12 may be configured (e.g., in the form of a funnel) to direct fuel material 14 toward material delivery system 36 (e.g., auger system 38 and/or the conveyor system).

Fuel material processing system 10 may include filtering system 42 that may be configured to filter fuel material 14 prior to fuel material 14 being received by hopper assembly 12. One example of filtering system 42 may include but is not limited to a screening system that may be configured to fit on top of hopper assembly 42, wherein fuel material 14 may be loaded into hopper assembly 12 (via e.g., a payloader or a dump truck, not shown) through filtering system 42. Filtering system 42 may be sized to allow for the passing of material (e.g., wood chips) into hopper assembly 14 that are small enough to be processed by combustion system 38; while prohibiting the passing of material (e.g., wood chips) into hopper assembly 12 that may be too large to be processed by combustion system 38.

Drying system 16 may further include drying air heating system 44 configured to heat drying air 22. Drying air heating system 44 may allow for the use of fuel material processing system 10 in colder climates and may promote more efficient drying of fuel material 14. An example of drying air heating system 44 may include but is not limited to a heat exchanger system that may be configured to recover at least a portion of the waste heat generated by combustion system 38. For example, the heat exchanger may be configured to absorb the thermal energy included within exhaust 46 of combustion system 38 by being heated by exhaust 46 of combustion system 38. If the heat exchanger is positioned proximate an inlet (e.g., inlet 48) of drying system 16, the heat absorbed by the heat exchanger may be used to preheat the air (e.g., air 50) provided to drying system 16. Alternatively, if the heat exchanger is positioned proximate an outlet of drying system 52, the heat absorbed by the heat exchanger may be used to heat drying air 22. Alternatively still, drying air heating system 44 may include a combustion-based material heating system configured to burn a combustible fuel (e.g., heating oil, kerosene, propane, natural gas, etc.).

Fuel material processing system 10 may include material heating system 54 that may be configured to heat fuel material 14 within hopper assembly 12. Material heating system 54 may allow for the use of fuel material processing system 10 in colder climates and may allow for the thawing/warming of fuel material 14 when such fuel material 14 is frozen. An example of material heating system 54 may include but is not limited to a combustion-based material heating system configured to burn combustible fuel 56 (e.g., heating oil, kerosene, propane, natural gas, etc.) so that thermal energy 58 may be provided to hopper system 12 and fuel material 14 may be thawed and/or warmed.

During operation, fuel material processing system 10 may dry fuel material 14 to produce dried fuel material 18. Dried fuel material 18 extracted from hopper system 12 by material delivery system 36 may be provided to combustion system 38. For example and once dried fuel material 18 is extracted from hopper system 12, dried fuel material 18 may simply be provided to combustion system 38. Alternatively and as shown in FIG. 1, dried fuel material 18 may be provided to feed system 60 (e.g., a conveyor system) that may be configured to provide dried fuel material 18 to combustion system 38.

Combustion system 38 may be interfaced with motor 40 that is configured to drive (in this example) auger system 38. Specifically, combustion system 38 may be configured to monitor e.g., the water jacket temperature of combustion system 38, wherein a decrease of the water jacket temperature below a desired set point (e.g., 160 degrees Fahrenheit) may result in the feed rate of material delivery system 36 and/or feed system 60 being increased, while an increase of the water jacket temperature above a desired set point (e.g., 160 degrees Fahrenheit) may result in the feed rate of material delivery system 36 and/or feed system 60 being decreased.

General:

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A fuel material processing system comprising:
   a hopper assembly configured to receive a fuel material, wherein the hopper assembly is constructed from one or more materials depending upon the density of a respective fuel material being received by the hopper assembly, such that the one or more materials comprises, at least in part,
   sheet metal when storing a respective fuel material having a lower density, and
   plate steel when storing a respective fuel material having a higher density;
   a drying system configured to remove moisture from the fuel material to generate a dried fuel material;
   a material delivery system configured to provide the dried fuel material to a combustion system, wherein the combustion system is configured to monitor a water jacket temperature of the combustion system, wherein a decrease of the water jacket temperature below a predefined threshold results in an increase of a feed rate of the material delivery system; and
   a level monitoring system configured to determine the quantity of fuel material included within the hopper assembly, wherein upon determining the quantity of fuel material is at a predefined level within the hopper assembly, providing a signal to a third party indicating that the fuel material in the hopper assembly needs to be replenished.

2. The fuel material processing system of claim 1 wherein the combustion system includes a boiler system.

3. The fuel material processing system of claim 1 wherein the hopper assembly is configured to direct the dried fuel material toward the material delivery system.

4. The fuel material processing system of claim 3 wherein the material delivery system includes an auger system.

5. The fuel material processing system of claim 3 wherein the material delivery system includes a conveyer system.

6. The fuel material processing system of claim 1 wherein the drying system includes:
   an air supply system configured to move drying air through the fuel material.

7. The fuel material processing system of claim 6 wherein the air supply system includes:
   a fan assembly configured to provide the drying air.

8. The fuel material processing system of claim 6 wherein the drying system further includes:
   a drying air heating system configured to heat the drying air.

9. The fuel material processing system of claim 8 wherein the drying air heating system includes:
   a heat exchanger system configured to recover at least a portion of the waste heat generated by the combustion system.

10. The fuel material processing system of claim 6 wherein the hopper assembly includes:
    a perforated portion that is configured to allow for the passage of the drying air.

11. The fuel material processing system of claim 10 wherein the perforated portion of the hopper assembly is positioned proximate a lower portion of the hopper assembly.

12. The fuel material processing system of claim 1 further comprising:
a material heating system configured to heat the fuel material included within the hopper assembly.

13. The fuel material processing system of claim 12 wherein the material heating system includes:
a combustion-based material heating system.

14. The fuel material processing system of claim 1 wherein the fuel material is a high-moisture fuel material.

15. The fuel material processing system of claim 14 wherein the high-moisture fuel material includes:
high-moisture wood chips.

16. The fuel material processing system of claim 1 further comprising:
a filtering system configured to filter the fuel material prior to the fuel material being received by the hopper assembly.

17. The fuel material processing system of claim 16 wherein the filtering system includes a screening system.

18. A fuel material processing system comprising:
a hopper assembly configured to receive a fuel material, wherein the fuel material is a high-moisture fuel material, wherein the hopper assembly is constructed from one or more materials depending upon the density of a respective fuel material being received by the hopper assembly, such that the one or more materials comprises, at least in part,
sheet metal when storing a respective fuel material having a lower density, and
plate steel when storing a respective fuel material having a higher density;
a drying system configured to remove moisture from the fuel material to generate a dried fuel material, wherein the drying system includes an air supply system configured to move drying air through the fuel material;
a material delivery system configured to provide the dried fuel material to a combustion system, wherein the combustion system is configured to monitor a water jacket temperature of the combustion system, wherein a decrease of the water jacket temperature below a predefined threshold results in an increase of a feed rate of the material delivery system;
wherein the hopper assembly includes a perforated portion that is configured to allow for the passage of the drying air; and
a level monitoring system configured to determine the quantity of fuel material included within the hopper assembly, wherein upon determining the quantity of fuel material is at a predefined level within the hopper assembly, providing a signal to a third party indicating that the fuel material in the hopper assembly needs to be replenished.

19. A fuel material processing system comprising:
a hopper assembly configured to receive high-moisture wood chips, wherein the hopper assembly is constructed from one or more materials depending upon the density of a respective fuel material being received by the hopper assembly, such that the one or more materials comprises, at least in part,
sheet metal when storing a respective fuel material having a lower density, and
plate steel when storing a respective fuel material having a higher density;
a drying system configured to remove moisture from the high-moisture wood chips to generate a dried fuel material, wherein the drying system includes an air supply system configured to move drying air through the high-moisture wood chips;
a material delivery system configured to provide the dried fuel material to a combustion system, wherein the material delivery system includes an auger system, wherein the combustion system is configured to monitor a water jacket temperature of the combustion system, wherein a decrease of the water jacket temperature below a predefined threshold results in an increase of a feed rate of the material delivery system;
wherein the hopper assembly is configured to direct the dried fuel material toward the material delivery system, the hopper assembly including:
a perforated portion that is configured to allow for the passage of the drying air; and
a level monitoring system configured to determine the quantity of fuel material included within the hopper assembly, wherein upon determining the quantity of fuel material is at a predefined level within the hopper assembly, providing a signal to a third party indicating that the fuel material in the hopper assembly needs to be replenished.

* * * * *